(12) United States Patent
Nogueira-Nine et al.

(10) Patent No.: US 10,849,210 B2
(45) Date of Patent: Nov. 24, 2020

(54) LOW COST BATTERY-LESS LIGHT SWITCH ARCHITECTURE AND PAIRING METHOD

(71) Applicant: Flex Ltd., Singapore (SG)

(72) Inventors: Juan Benigno Nogueira-Nine, Stuttgart (DE); Johan Botvidzon, Mantorp (SE); Christian Eric Hollowell, Linköping (SE); Mikael Kent Gustavsson, Linköping (SE)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/585,394

(22) Filed: Sep. 27, 2019

(65) Prior Publication Data

US 2020/0100346 A1 Mar. 26, 2020

Related U.S. Application Data (63) Continuation of application No. 16/046,043, filed on Jul. 26, 2018, now abandoned.

(60) Provisional application No. 62/537,820, filed on Jul. 27, 2017.

(51) Int. Cl.
H05B 47/19 (2020.01)

(52) U.S. Cl.
CPC ......... H05B 47/19 (2020.01); *H01H 2300/03* (2013.01)

(58) Field of Classification Search
CPC .................................................. H01H 2300/03
See application file for complete search history.

(56) References Cited

U.S. PATENT DOCUMENTS

| | | | | |
|---|---|---|---|---|
| 8,994,276 B2* | 3/2015 | Recker | ................ | H05B 47/11 |
| | | | | 315/160 |
| 9,236,767 B2* | 1/2016 | Recker | ................ | H05B 47/19 |
| 9,252,595 B2* | 2/2016 | Recker | ................ | H05B 45/00 |
| 9,860,077 B2* | 1/2018 | Laurent | ................ | H04L 12/282 |
| 9,860,965 B2* | 1/2018 | Recker | ................ | H02J 9/02 |
| 9,993,166 B1* | 6/2018 | Johnson | .............. | A61B 5/0205 |
| 10,004,451 B1* | 6/2018 | Proud | ................ | A61M 21/02 |
| 10,058,290 B1* | 8/2018 | Proud | ................ | A61B 5/0022 |
| 10,270,618 B1* | 4/2019 | Saes | ...................... | H05B 45/00 |

(Continued)

OTHER PUBLICATIONS

Official Action for U.S. Appl. No. 16/046,043, dated Jun. 28, 2019 14 pages.

*Primary Examiner* — Amy Cohen Johnson
*Assistant Examiner* — Srinivas Sathiraju
(74) *Attorney, Agent, or Firm* — Sheridan Ross P.C.

(57) ABSTRACT

According to one embodiment, a lighting system can comprise a light source and a light switch. The light switch can comprise a binary switch, a wireless transmitter, a processor, and a memory coupled with and readable by the processor and storing therein a code identifying the light switch. A light driver can be coupled with the light source. The light driver can comprise a pairing switch, a wireless receiver, a processor, and a memory coupled with and readable by the processor and storing therein a set of instructions which, when executed by the processor, causes the processor to pair with the light switch by receiving, from the pairing button, a first input indicating a start of a pairing mode, initiating the pairing mode based on the first input, and determining whether a message is received from the light switch within a first predetermined period of time.

14 Claims, 5 Drawing Sheets

(56) References Cited

U.S. PATENT DOCUMENTS

| | | | | |
|---|---|---|---|---|
| 10,292,245 B2* | 5/2019 | Taipale | | H05B 41/14 |
| 2010/0127634 A1* | 5/2010 | Dowling | | H05B 47/10 |
| | | | | 315/291 |
| 2010/0141153 A1* | 6/2010 | Recker | | H05B 47/20 |
| | | | | 315/149 |
| 2010/0327766 A1* | 12/2010 | Recker | | H05B 45/00 |
| | | | | 315/291 |
| 2011/0248644 A1* | 10/2011 | Welten | | H05B 47/175 |
| | | | | 315/291 |
| 2012/0043889 A1* | 2/2012 | Recker | | H05B 47/19 |
| | | | | 315/86 |
| 2012/0187845 A1* | 7/2012 | Saes | | H05B 45/37 |
| | | | | 315/113 |
| 2012/0249013 A1* | 10/2012 | Valois | | H05B 45/10 |
| | | | | 315/291 |
| 2013/0026942 A1* | 1/2013 | Ryan | | H05B 47/19 |
| | | | | 315/224 |
| 2014/0009063 A1* | 1/2014 | Cregg | | H05B 47/185 |
| | | | | 315/34 |
| 2014/0217903 A1* | 8/2014 | Platner | | H05B 47/105 |
| | | | | 315/152 |
| 2014/0285095 A1* | 9/2014 | Chemel | | H05B 47/155 |
| | | | | 315/152 |
| 2014/0320021 A1* | 10/2014 | Conwell | | H04W 4/50 |
| | | | | 315/152 |
| 2016/0183351 A1* | 6/2016 | Snyder | | H04L 12/2825 |
| | | | | 315/152 |
| 2016/0192452 A1* | 6/2016 | Ganick | | G01S 1/70 |
| | | | | 315/224 |
| 2016/0330825 A1* | 11/2016 | Recker | | H05B 47/19 |
| 2017/0086281 A1* | 3/2017 | Avrahamy | | C02F 1/42 |
| 2017/0223801 A1* | 8/2017 | Gan | | H05B 47/155 |
| 2017/0223807 A1* | 8/2017 | Recker | | H02J 7/34 |
| 2018/0009330 A1* | 1/2018 | Ricci | | G07C 5/008 |
| 2018/0014383 A1* | 1/2018 | Pennycooke | | H01H 21/22 |
| 2018/0205459 A1 | 7/2018 | Verma et al. | | |
| 2018/0248760 A1* | 8/2018 | Deixler | | H04W 4/023 |
| 2019/0037670 A1 | 1/2019 | Nogueira-Nine et al. | | |

* cited by examiner

LOW COST BATTERY-LESS LIGHT SWITCH ARCHITECTURE AND PAIRING METHOD

CROSS REFERENCE TO RELATED APPLICATION

The present application is a continuation of and claims priority to U.S. application Ser. No. 16/046,043, filed Jul. 26, 2018 and entitled "LOW COST BATTERY-LESS LIGHT SWITCH ARCHITECTURE AND PAIRING METHOD," which claims the benefits of and priority, under 35 U.S.C. § 119(e), to U.S. Provisional Application No. 62/537,820 filed Jul. 27, 2017 by Nogueira-Nine et al and entitled "Low Cost Battery-less Light Switch Architecture and Pairing Method" of which the entire disclosure is incorporated herein by reference for all purposes.

FIELD OF THE DISCLOSURE

Embodiments of the present disclosure relate generally to methods and systems for controlling light sources and more particularly to wireless pairing of light switches to one or more light drivers controlling light sources.

BACKGROUND

In the area of smart lighting, the radio technology Bluetooth Low Energy (BLE) has been established as the de facto communication standard because of the widespread use of this technology and the availability of BLE in most of today's smartphones. However, in many use cases, the communication range provided by BLE is not sufficient if, for example, the communication parts (e.g., the light switch and/or the light driver) are farther away than what BLE can provide for range, e.g., the devices are not in the same room. Having a BLE receiver in the light driver has the benefit of enabling smartphones to control the lights but having BLE in the light switch does not give any added value to the system. Furthermore, the home lighting sector is highly price sensitive and there are other less complex wireless technologies able to do the job with less cost. Hence, there is a need for improved methods and systems for controlling light sources.

BRIEF SUMMARY

Embodiments of the disclosure provide systems and methods for wireless pairing of light switches to one or more light drivers controlling light sources. According to one embodiment, a lighting system can comprise a light source and a light switch. The light switch can comprise a binary switch, a wireless transmitter, a processor, and a memory coupled with and readable by the processor and storing therein a code identifying the light switch. A light driver can be coupled with the light source. The light driver can comprise a pairing switch, a wireless receiver, a processor, and a memory coupled with and readable by the processor and storing therein a set of instructions which, when executed by the processor, causes the processor to pair with the light switch by receiving, from the pairing button, a first input indicating a start of a pairing mode, initiating the pairing mode based on the first input, and determining whether a message is received from the light switch within a first predetermined period of time.

The instructions stored in the memory of the light switch, when executed by the processor of the light switch, can cause the processor to detect an operation of the binary switch and send, in response to detecting the operation of the binary switch, the message through the wireless transmitter to the wireless receiver of the light driver. The code identifying the light switch can be used to modulate the message. In response to determining the message is received from the light switch within the first predetermined period of time, the light driver can read the code identifying the light switch modulated into the message and store the code identifying the light switch in the memory of the light driver. Alternatively, the light driver can terminate the pairing mode in response to determining the message is not received from the light switch within the first predetermined period time.

The instructions stored in the memory of the light switch, when executed by the processor of the light switch, can cause the processor to detect an operation of the binary switch. The operation of the binary switch can place the binary switch into one of an on position or an off position. In response to detecting the operation of the binary switch places the binary switch into the on position, the switch can send, through the wireless transmitter, a command to turn on the light source coupled with the light driver. The code identifying the light switch can be modulated into the command. The light driver can receive, through the wireless receiver, the command from the light switch, demodulate the received command from the light switch using the code identifying the light switch stored in the memory of the light driver, and turn the light on based on the demodulated command. In response to detecting the operation of the binary switch places the binary switch into the off position, the light switch can send, through the wireless transmitter, a command to turn off the light source coupled with the light driver. Again, the code identifying the light switch can be modulated into the command. The light driver can receive, through the wireless receiver, the command from the light switch, demodulate the received command from the light switch using the code identifying the light switch stored in the memory of the light driver, and turn the light off based on the demodulated command.

The instructions stored in the memory of the light driver, when executed by the processor of the light driver, can further cause the light driver to receive, from the pairing button, a second input indicating a start of a de-pairing mode. In response to the second input, the processor of the light driver can delete the code identifying the light switch stored in the memory of the light driver.

In some cases, the lighting system can further comprise a wireless device, the wireless device can comprise a processor and a memory having stored therein a set of instructions which, when executed by the processor, causes the processor to pair with the light driver through the wireless receiver of the light driver. Pairing with the light driver can comprise sending, from the wireless device to the wireless receiver of the light driver, a message modulated with a pairing code. The pairing code can be used by the light driver to identify the wireless device. The wireless device can further control the light source through the light driver. Controlling the light source through the light driver can comprise sending, from the wireless device to the wireless receiver of the light driver, a command modulated with the pairing code. The light driver can then control the light source based on the command.

According to another embodiment, a light driver can comprise a pairing switch, a wireless receiver, a processor, and a memory coupled with and readable by the processor and storing therein a set of instructions which, when executed by the processor, causes the processor to pair with a light switch by receiving, from the pairing button, a first input indicating a start of a pairing mode, initiating the pairing mode based on the first input, and determining whether a message is received from the light switch within a first predetermined period of time. In response to determining the message is received from the light switch within the first predetermined period of time, the light driver can read a code identifying the light switch modulated into the message and store the code identifying the light switch in the memory of the light driver. Alternatively, the light driver can terminate the pairing mode in response to determining the message is not received from the light switch within the first predetermined period time.

The instructions can further cause the light driver to receive, through the wireless receiver, a command from the light switch, demodulate the received command from the light switch using the code identifying the light switch stored in the memory of the light driver, and turn on a light coupled with the light driver on based on the demodulated command. Additionally, or alternatively, the instructions can cause the light driver to receive, through the wireless receiver, a command from the light switch, demodulate the received command from the light switch using the code identifying the light switch stored in the memory of the light driver, and turn off a light coupled with the light driver based on the demodulated command.

In some cases, the instructions can further cause the light driver to receive, from the pairing button, a second input indicating a start of a de-pairing mode. In response to the second input, the instructions can cause the processor of the light driver to delete the code identifying the light switch stored in the memory of the light driver.

According to yet another embodiment, a light switch can comprise a binary switch, a wireless transmitter, a processor, and a memory coupled with and readable by the processor and storing therein a code identifying the light switch and a set of instructions which, when executed by the processor, cause the processor to pair with a wireless light driver through the wireless transmitter using the code identifying the light switch. Pairing with the light driver can comprise detecting an operation of the binary switch and sending, in response to detecting the operation of the binary switch, a message through the wireless transmitter to a wireless receiver of the light driver, wherein the code identifying the light switch can be modulated into the message. The instructions can further cause the light switch to detect an operation of the binary switch, the operation of the binary switch placing the binary switch into one of an on position or an off position. In response to detecting the operation of the binary switch places the binary switch into the on position, the instructions can cause the processor of the light switch to send, through the wireless transmitter, a command to turn on the light source coupled with the light driver, wherein the code identifying the light switch is modulated into the command. In response to detecting the operation of the binary switch places the binary switch into the off position, the instructions can cause the processor of the light switch to send, through the wireless transmitter, a command to turn off the light source coupled with the light driver, wherein the code identifying the light switch is modulated into the command.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
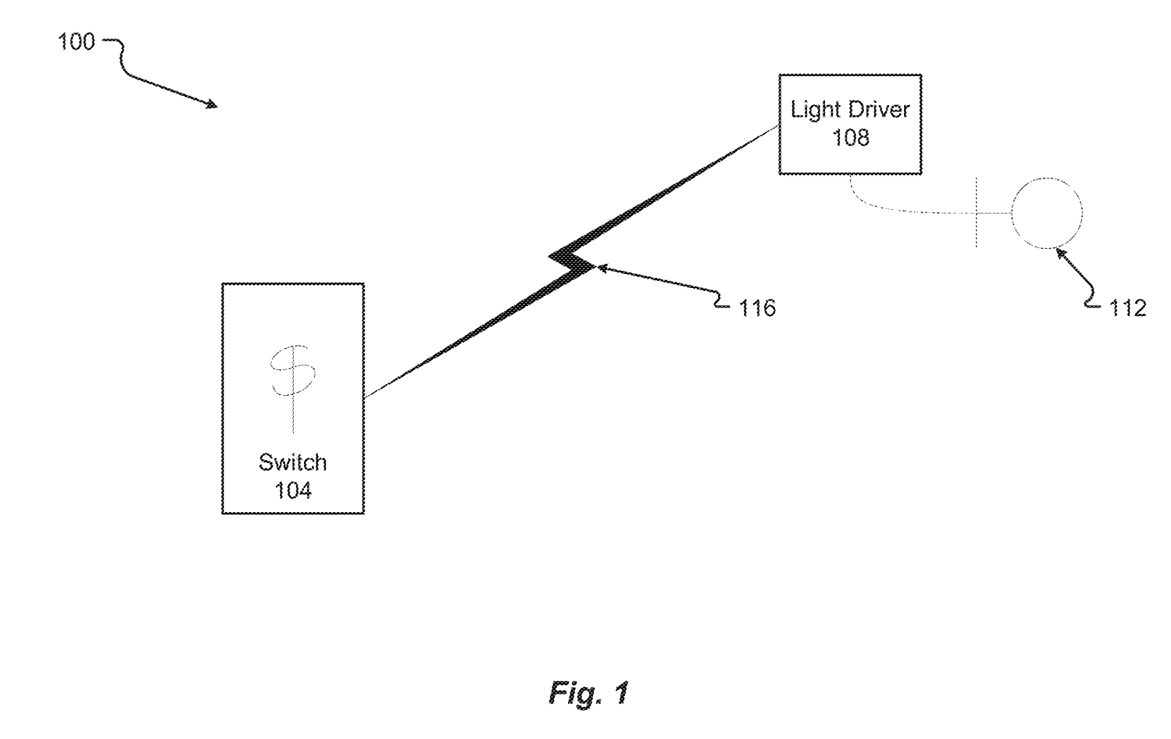
FIG. 1 is a block diagram of a lighting system in accordance with embodiments of the present disclosure.

It is with respect to the above issues and other problems that the embodiments presented herein were contemplated. In general, embodiments of the present disclosure provide methods, devices, and systems by which lights in a building can be controlled As shown in FIG. 1, a lighting environment 100 can include a light switch 104 and a light driver 108 in wireless communication, through wireless link/channel 116. The light driver 108 powers the light 112 based on commands from the light switch 104.

Figure 2A:
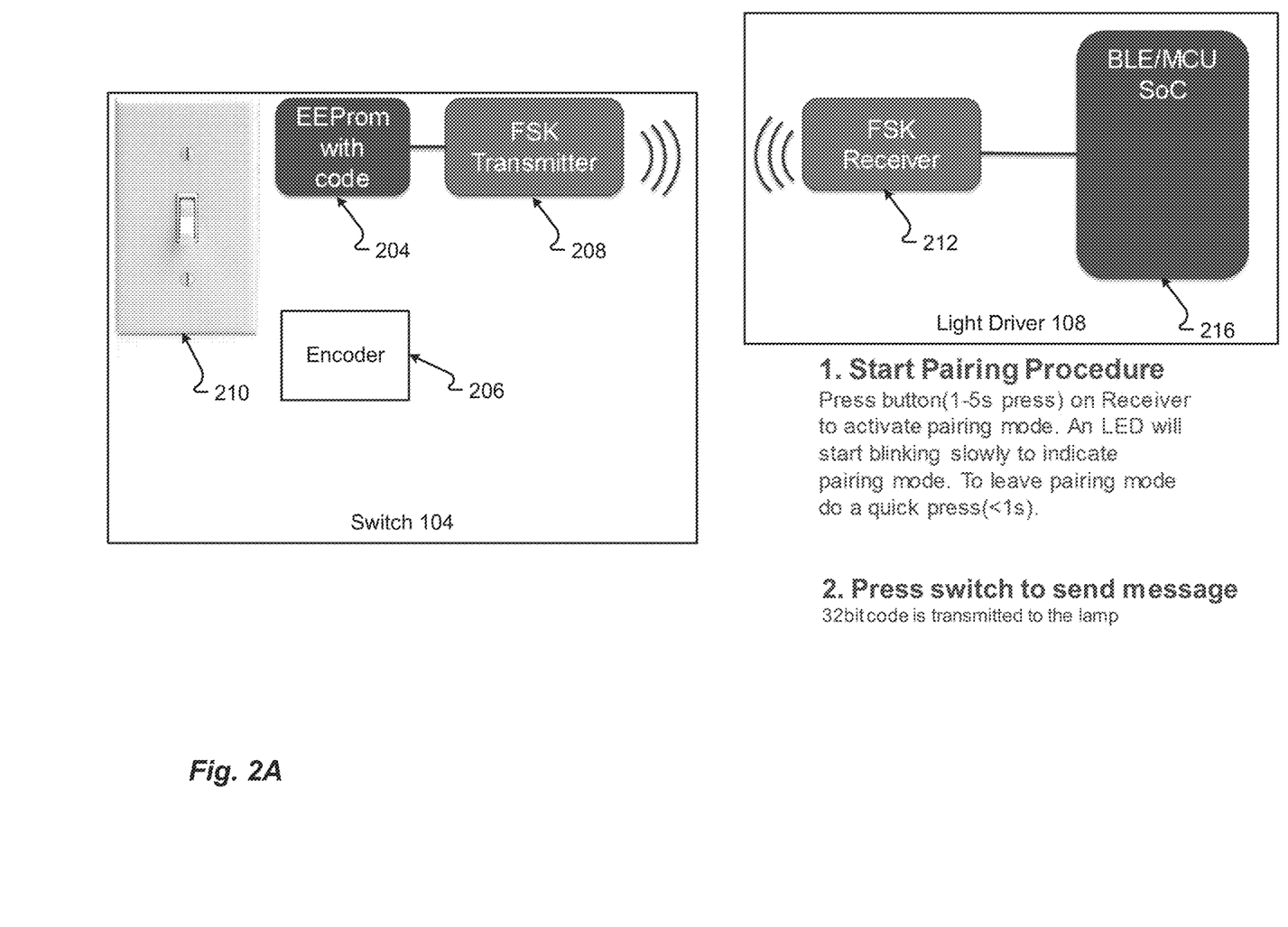
FIG. 2A is another block diagram of a lighting system in accordance with embodiments of the present disclosure.
Figure 2B:
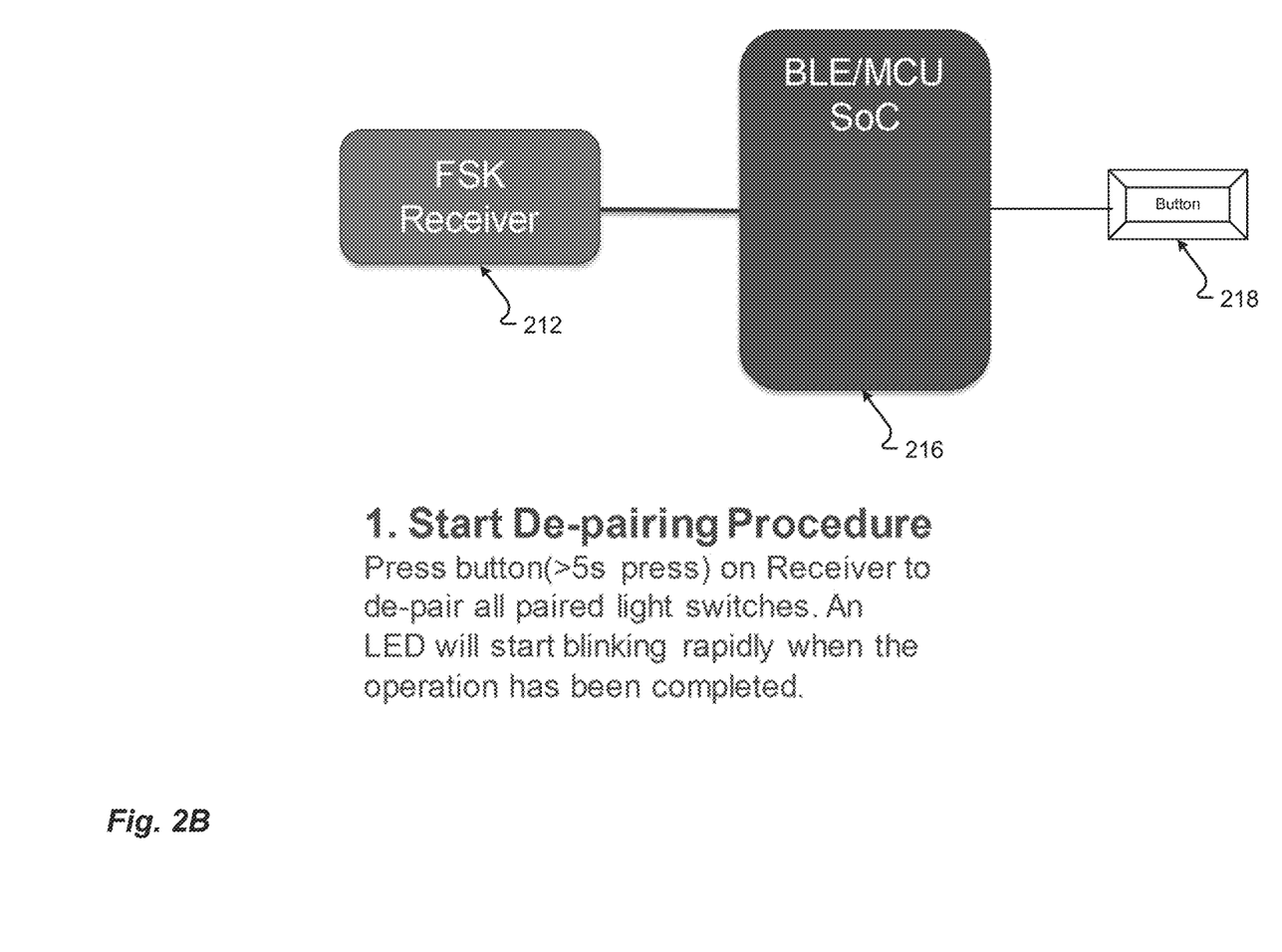
FIG. 2B is another block diagram of a lighting system in accordance with embodiments of the present disclosure.

Referring now to FIGS. 2A though 2C, the light switch 104 and/or light driver 108 can use a mixed and asymmetric solution employing a cheap frequency-shift keying (FSK) only transmitter 208 (or other suitable transmitter) in the light switch 104 and a FSK Receiver 212 and/or a BLE transceiver 216 (or other suitable receiver(s)) in the light driver 108. The light switch 104 can comprise a FSK transmitter 208, a memory 204, which may be an electrically erasable programmable read-only memory (EEPROM) or other suitable memory device, storing a unique code and an ultra-low cost digital encoder 206. When the binary switch 210 is pressed, the encoder 206 reads the code stored in the memory 204 and modulates such a code in a radio signal by using FSK modulation with the FSK transmitter 208.

Further, the light driver can include an FSK receiver 212, a microcontroller (MCU) with memory and possibly with a BLE transceiver 216, and a pairing button (not shown). Ideally, because of cost issues and integration level, the MCU and the BLE transceiver can be combined in a System-on-Chip (SoC) 216. The FSK receiver 212, in the light driver 108, may always be on and ready to receive a signal coming from the light switch 104.

Stated another way, a lighting system 100 can comprise a light source 112 and a light switch 104. The light switch can comprise a binary switch 210, a wireless transmitter 208, a processor 206, and a memory 204 coupled with and readable by the processor 206 and storing therein a code identifying the light switch 104. A light driver 108 can be coupled with the light source 112. The light driver 108 can comprise a pairing switch 218, a wireless receiver 212, a processor 216, and a memory coupled with and readable by the processor 216 and storing therein a set of instructions which, when executed by the processor 216, causes the processor 216 to pair with the light switch 104 by receiving, from the pairing button 218, a first input indicating a start of a pairing mode, initiating the pairing mode based on the first input, and determining whether a message is received from the light switch 104 within a first predetermined period of time.

The instructions stored in the memory of the light switch, when executed by the processor of the light switch 104, can cause the processor 206 to detect an operation of the binary switch 210 and send, in response to detecting the operation of the binary switch 210, the message through the wireless transmitter 208 to the wireless receiver 212 of the light driver 108. The code can identifying the light switch 104 can be used to modulate the message. In response to determining the message is received from the light switch 104 within the first predetermined period of time, the light driver 108 can read the code identifying the light switch modulated into the message and store the code identifying the light switch in the memory of the light driver 108. Alternatively, the light driver 108 can terminate the pairing mode in response to determining the message is not received from the light switch 104 within the first predetermined period time.

The instructions stored in the memory of the light switch 104, when executed by the processor 206 of the light switch 104, can cause the processor to detect an operation of the binary switch 210. The operation of the binary switch 210 can place the binary switch 210 into one of an on position or an off position. In response to detecting the operation of the binary switch 210 places the binary switch 210 into the on position, the switch 104 can send, through the wireless transmitter 208, a command to turn on the light source 112 coupled with the light driver 108. The code identifying the light switch 104 can be modulated into the command. The light driver 108 can receive, through the wireless receiver 212, the command from the light switch 104, demodulate the received command from the light switch 104 using the code identifying the light switch 104 stored in the memory of the light driver 108, and turn the light 112 on based on the demodulated command. In response to detecting the operation of the binary switch 210 places the binary switch 210 into the off position, the light switch 104 can send, through the wireless transmitter 208, a command to turn off the light source 112 coupled with the light driver 108. Again, the code identifying the light switch 104 can be modulated into the command. The light driver 108 can receive, through the wireless receiver 212, the command from the light switch 104, demodulate the received command from the light switch 104 using the code identifying the light switch 104 stored in the memory of the light driver 108, and turn the light 112 off based on the demodulated command.

The instructions stored in the memory of the light driver 108, when executed by the processor 216 of the light driver 108, can further cause the light driver 108 to receive, from the pairing button 218, a second input indicating a start of a de-pairing mode. In response to the second input, the processor 216 of the light driver 108 can delete the code identifying the light switch 104 stored in the memory of the light driver 108.

Figure 3:
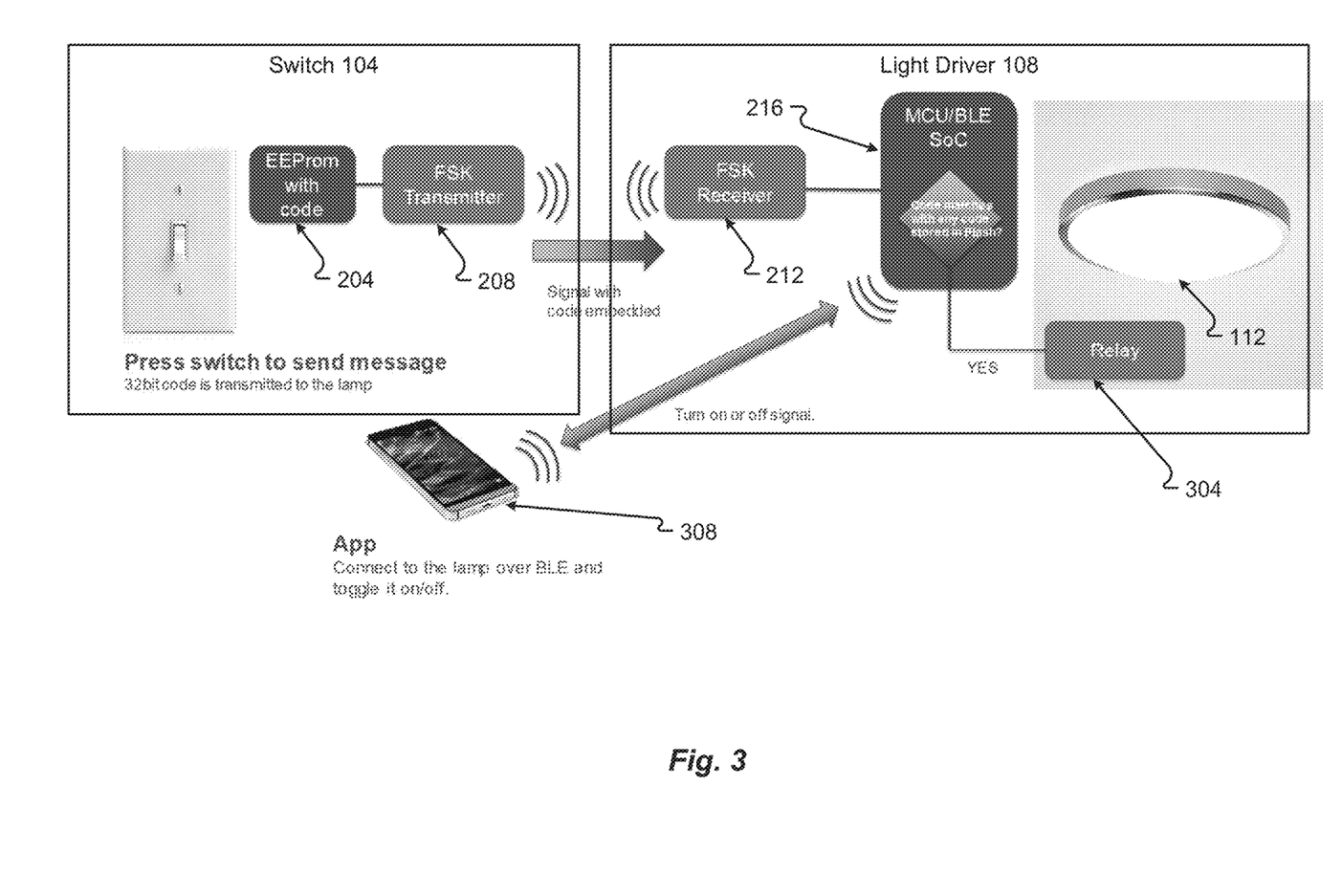
FIG. 3 is another block diagram of a lighting system in accordance with embodiments of the present disclosure.

FIG. 3 is another block diagram of a lighting system in accordance with embodiments of the present disclosure. In some cases and as illustrated in this example, the lighting system can further comprise a wireless device 308. The wireless device 308 can comprise a processor and a memory having stored therein a set of instructions which, when executed by the processor, causes the processor to pair with the light driver 108 through the wireless receiver 212 of the light driver 108. Pairing with the light driver 108 can comprise sending, from the wireless device 308 to the wireless receiver 212 of the light driver 108, a message modulated with a pairing code. The pairing code can be used by the light driver 108 to identify the wireless device 308. The wireless device 308 can further control the light source 112 through the light driver 108. Controlling the light source 112 through the light driver 108 can comprise sending, from the wireless device 308 to the wireless receiver 212 of the light driver 108, a command modulated with the pairing code. The light driver 108 can then control the light source 112 based on the command.

Figure 4:
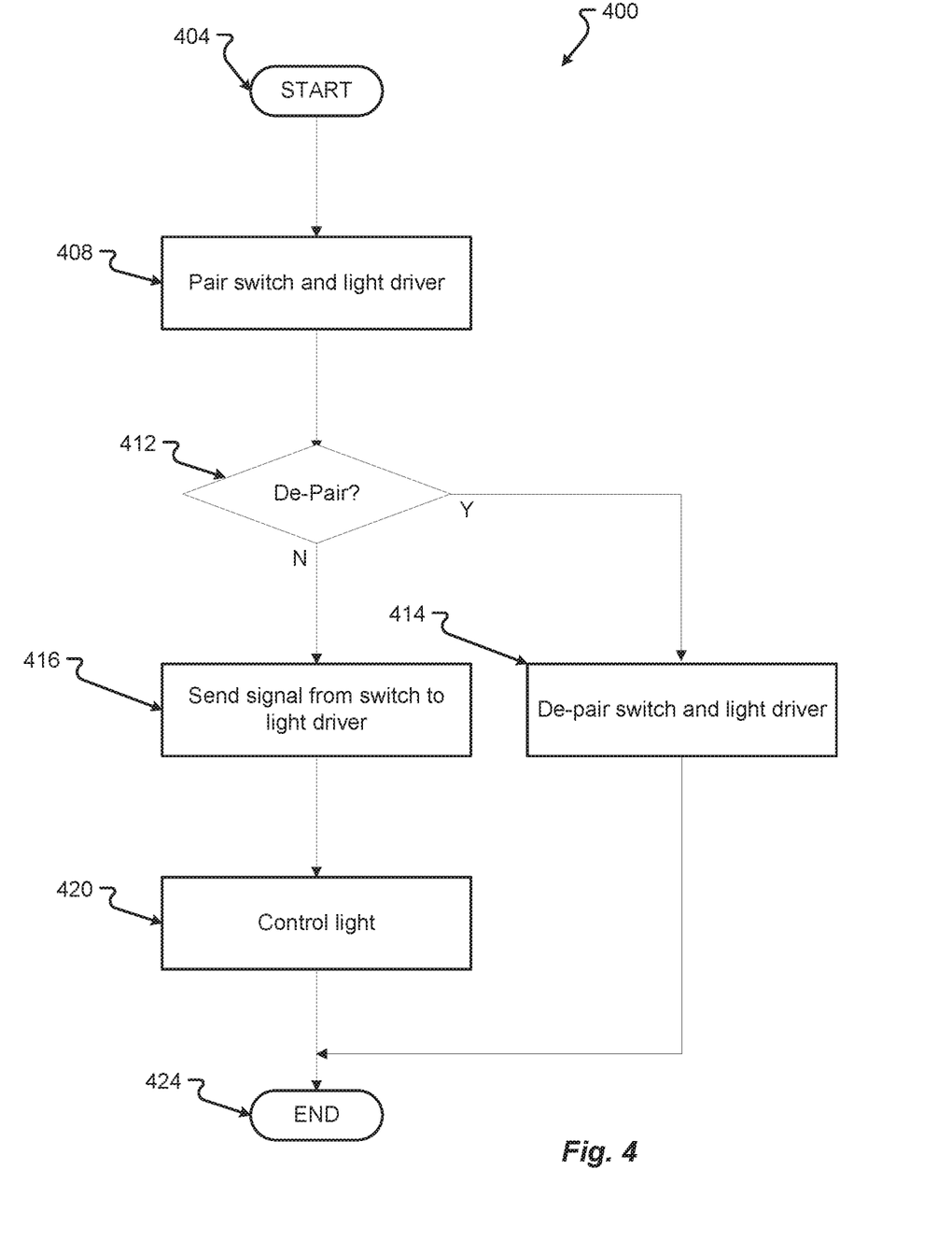
FIG. 4 shows a method for controlling lights in accordance with embodiments of the present disclosure.

Now referring to the method 400 in FIG. 4, when the pairing button on the light driver 108 is pressed for a predetermined period of time, e.g., between 1 and 5 seconds, the MCU 216 of the light driver 108 enters the pairing mode and awaits a FSK signal 116, from the light switch 104, with code information. This code information is stored in the memory in the SoC 216 and the light switch 104 is registered on the light driver 108, in step 408. This pairing process 408 can be repeated with multiple light switches 104 so same light 112 can be operated from several light switches 104.

Optionally, in steps 412 and 414, the light driver 108 can de-pair one or more devices. For example, by pressing the pairing button on the light driver 108 for a predetermined period of time, e.g., for more than 5 seconds, all the codes stored in the driver memory on the SoC 216 will be deleted. Upon deleting the codes, the light switch 104 and all other devices are de-paired from the light driver 108.

In step 416, the light switch encoder 206 of the light switch 104 can now send on/off commands to the light driver 108, which compares the transmitted code in the FSK signal with codes stored in the memory of the SoC 216 to identify and verify the light switch 104 is on the list of registered devices that can operate this light driver 108. When verified, the SoC 216 of the light driver 108 can send a signal to a relay 304 to control the light 112, in step 420.

Further, a wireless device 308 may also control the light driver 108, in steps 416/420. The light driver 108 can include a BLE transceiver on the SoC 216. Thus, a wireless device 308 with BLE technology can directly commute with the light driver 108 to turn the light 112 ON and OFF. The pairing between the wireless device 308 and the light driver 108 may take place like a standard BLE pairing process, or the smartphone 304 can be used to scan a QR code from a sticker in or on the light switch 108 that encodes the unique light switch code. Then, the wireless device 308 can be used to operate the light 112 without the need to pair the wireless device 308 with every singled light driver 108. Rather, the wireless device 308 can send one light switch code, in the BLE message, to the driver 108.

With this improved procedure, it is also possible to create a list of light switch codes that can be transferred form one wireless device 308 to another without having to proceed with the pairing process again.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the connection of a battery to a cooling plate. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A lighting system comprising:
a light source;
a light switch comprising:
   a binary switch,
   a wireless transmitter,
   a processor, and
   a memory coupled with and readable by the processor and storing therein a code identifying the light switch; and
a light driver coupled with the light source, the light driver comprising:
   a pairing switch,
   a wireless receiver,
   a processor, and
   a memory coupled with and readable by the processor and storing therein a set of instructions which, when executed by the processor, causes the processor to pair with the light switch by receiving, from the pairing switch, a first input indicating a start of a pairing mode, initiating the pairing mode based on the first input, determining whether a message is received from the light switch within a first predetermined period of time, and terminating the pairing mode in response to determining that the message is not received from the light switch within the first predetermined period of time.

2. The lighting system of claim 1, wherein the instructions stored in the memory of the light switch, when executed by the processor of the light switch, cause the processor to:
detect an operation of the binary switch; and
send, in response to detecting the operation of the binary switch, the message through the wireless transmitter to the wireless receiver of the light driver, wherein the code identifying the light switch is modulated the message.

3. The lighting system of claim 2, wherein the instructions stored in the memory of the light driver, when executed by the processor of the light driver, cause the processor to, in response to determining the message is received from the light switch within the first predetermined period of time, read the code identifying the light switch modulated into the message and store the code identifying the light switch in the memory of the light driver.

4. The lighting system of claim 3, wherein the instructions stored in the memory of the light switch, when executed by the processor of the light switch, cause the processor to:
detect an operation of the binary switch; and
in response to detecting the operation of the binary switch places the binary switch into an on position, send, through the wireless transmitter, a command to turn on the light source coupled with the light driver, wherein the code identifying the light switch is modulated into the command.

5. The lighting system of claim 4, wherein the instructions stored in the memory of the light driver, when executed by the processor of the light driver, further cause the light driver to receive, through the wireless receiver, the command from the light switch, demodulate the received command from the light switch using the code identifying the light switch stored in the memory of the light driver, and turn the light source on based on the demodulated received command.

6. The lighting system of claim 3, wherein the instructions stored in the memory of the light switch, when executed by the processor of the light switch, cause the processor to:
in response to detecting the operation of the binary switch places the binary switch into an off position, send, through the wireless transmitter, a command to turn off the light source coupled with the light driver, wherein the code identifying the light switch is modulated into the command.

7. The lighting system of claim 6, wherein the instructions stored in the memory of the light driver, when executed by the processor of the light driver, further cause the light driver to receive, through the wireless receiver, the command from the light switch, demodulate the received command from the light switch using the code identifying the light switch stored in the memory of the light driver, and turn the light off based on the demodulated command.

8. The lighting system of claim 1, wherein the instructions stored in the memory of the light driver, when executed by the processor of the light driver, further cause the light driver to:
receive, from the pairing switch, a second input indicating a start of a de-pairing mode; and
in response to the second input, delete the code identifying the light switch stored in the memory of the light driver.

9. The light system of claim 1, further comprising a wireless device, wherein the wireless device comprises a processor and a memory having stored therein a set of instructions which, when executed by the processor, causes the processor to:
pair with the light driver through the wireless receiver of the light driver, wherein pairing with the light driver comprises sending, from the wireless device to the wireless receiver of the light driver, a message modulated with a pairing code, the pairing code used by the light driver to identify the wireless device; and
control the light source through the light driver, wherein controlling the light source through the light driver comprises sending, from the wireless device to the wireless receiver of the light driver, a command modulated with the pairing code, wherein the light driver controls the light source based on command.

10. A light driver comprising:
a pairing switch;
a wireless receiver;
a processor; and
a memory coupled with and readable by the processor and storing therein a set of instructions which, when executed by the processor, causes the processor to pair with a light switch by receiving, from the pairing switch, a first input indicating a start of a pairing mode, initiating the pairing mode based on the first input, determining whether a message is received from the light switch within a first predetermined period of time, and terminating the pairing mode in response to determining that the message is not received from the light switch within the first predetermined period of time.

11. The light driver of claim 10, wherein the instructions further cause the processor to, in response to determining the message is received from the light switch within the first predetermined period of time, read a code identifying the light switch modulated into the message and store the code identifying the light switch in the memory of the light driver.

12. The light driver of claim 11, wherein the instructions further cause the light driver to receive, through the wireless receiver, a command from the light switch, demodulate the received command from the light switch using the code identifying the light switch stored in the memory of the light driver, and turn on a light coupled with the light driver on based on the demodulated command.

13. The light driver of claim 11, wherein the instructions further cause the light driver to receive, through the wireless receiver, a command from the light switch, demodulate the received command from the light switch using the code identifying the light switch stored in the memory of the light driver, and turn off a light coupled with the light driver based on the demodulated command.

14. The light driver of claim 11, wherein the instructions further cause the light driver to:
   receive, from the pairing switch, a second input indicating a start of a de-pairing mode; and
   in response to the second input, delete the code identifying the light switch stored in the memory of the light driver.

* * * * *